United States Patent [19]

Brille

[11] 4,304,173
[45] Dec. 8, 1981

[54] THERMAL BARREL MOTOR

[75] Inventor: Maurice Brille, Nanterre-Hauts de Deine, France

[73] Assignee: Societe Civile de Recherches et d'Etudes de Moteurs a Barillet (S.C.R.E.B.), Hauts de Seine, France

[21] Appl. No.: 943,717

[22] Filed: Sep. 19, 1978

[30] Foreign Application Priority Data

Sep. 20, 1977 [FR] France .................... 77 28849

[51] Int. Cl.$^3$ ............................ F01B 31/14
[52] U.S. Cl. .................... 92/13.7; 60/516; 74/55; 92/12.2; 92/147
[58] Field of Search ............ 92/13.7, 147, 12.2; 60/516; 74/55

[56] References Cited

U.S. PATENT DOCUMENTS 1,977,424 10/1934 Blum ............................ 92/147
3,413,896 12/1968 Wildhaber ..................... 92/147
3,973,471 8/1976 Hirmann ....................... 92/92

FOREIGN PATENT DOCUMENTS 2232951 6/1973 France .
2194226 2/1974 France .

Primary Examiner—Abraham Hershkovitz
Attorney, Agent, or Firm—Remy J. VanOphem

[57] ABSTRACT

A motor and especially a thermal motor has a connecting rod assembly comprising two radial rolling surfaces constituted by pairs of cones, one cone of each pair being fixed while the other is carried by a rotatable inclined seat.

With this arrangement the position of the pistons of the motor at the end of their strokes is rigidly controlled and centered.

6 Claims, 9 Drawing Figures

THERMAL BARREL MOTOR

1. Field of the Invention

This invention relates to motors.

2. Background of the Invention

In French Pat. No. 2,194,226, the Applicant describes an axial or barrel motor wherein the cylinders have parallel axes equidistantly spaced from one another and from a central axis. The motor is a thermal barrel motor. The Patent discloses also that the cylinder axes subtend an equal but small angle with the central axis and converge at a point on this axis.

In this motor, the rectilinear reciprocation of the pistons is converted to a continuous circular rotation movement around the axis—or to angular reciprocatory motion.

BRIEF SUMMARY OF THE INVENTION

The essential principle of the present invention is to use a seat with an inclined axis. One end of the inclined end of axis rotates with the crank of a motor shaft and the other end rotates on a fixed axis by the rolling, without slipping, of a cone with two nappes integral with the seat on a cone with two nappes on the fixed axis. The rolling without slipping is assured by the engagement of teeth mounted on said first-mentioned cones and guidance being assured by the contact between pairs of smooth-surfaced cones, whereof the conical angle is smaller, equal to or greater than that said first-mentioned cones, all bearings or friction-inducing pivots being omitted.

Another feature resides in the possibility of the translational axial displacement of the fixed cones and consequently also the movable cones to the same degree so as to permit the change of the extreme positions of the beginning and end of the piston stroke and thus vary, at will, the compression ratio of the motor while stopped or running, by hand or automatically, as a function of a selected parameter.

The basic principle is such as to increase the output of the motor compared with known barrel motors and other known motors due to the substitution of the rolling with slipping to which they are subject.

The possibility of axial displacement provides increased output of motors according to the invention due to the improved adaptation of the compression ratio.

In French Patent of Addition No. 2,232,951 of the Applicant there is disclosed the attachment of connecting rods on a seat serving as a central pivot with an arrangement of pistons.

The first object of the present invention is to modify the range of angles of the aforesaid smooth cones and to introduce supplementary cones to provide radial rolling surfaces. The aim is to avoid the least displacement along the generatices of the cones and thus maintain the exact central positioning and absolute control of the end position of the piston stroke.

The provision of these radial surfaces has led to the inversion of the position of engagement of the smooth cones and the toothed cones compared with that in French Pat. No. 2,194,226, which inversion is foreshadowed in said Patent.

In the description, two arrangements of radial rolling surfaces are disclosed by way of example only.

A second object of this invention is to provide a novel method of securing the crank pins which combines the principle of the paired cones disclosed in French Pat. No. 2,232,951 with a known guidance method.

In this aforementioned Patent, the Applicant applies to the connections of connecting rods on the seat the same principle as is used at the central axis by employing only smooth cone pairs. Indeed, the analogy with the central axis is not total since the length of the connecting rods is not infinite, the connecting rods subtending an angle with the axes of the cylinders so that the mounting of the paired toothed cones would be incorrect. Moreover, they would be cumbersome and besides would not have a transmitting force as have the toothed cones at the central axis.

To avoid any slipping of the contiguous cones along their generatices of contact the means employed at the central axis (radially abutting cones) is not convenient due to the absence of toothed cone pairs.

In each of the two pairs of smooth cones, one has a summit angle of 180° which eliminates any relative axial movement. The radial guidance is assured by a hemispherical bearing which provides a slight slippage and thus a slight friction; this concession to known arrangements only involves slight friction since the radial forces only represent 6% of the axial forces applied to the cones when rolling.

A third object is to provide a good connection between the pistons and the connecting rods.

A preferred arrangement is a simple bi-conical piston connecting rod having a spherical fluid-tight segment in one or two parts lodged in the same throat and a known thin double-annular scraper ring.

Two more complicated modifications are proposed. The first uses a conventional U-shaped scraper ring mounted on a floating skirt, while the second uses a piston with a cylindrical exterior surface provided with conventional fluid seals, this piston no longer being rigid with the connecting rod but articulated thereto in the same way as it is to the seat, with a very small clearance angle.

A fourth object of the invention is to locate at the exterior of the motor, at a location which is easily accessible, a spring determining automatically the compression ratio as a function of the load, one element at least of this spring being a leaf spring serving simultaneously to angularly adjust elements fixed against rotation at the axis and to transmit to the motor casing a reaction couple. These two functions, difficult enough to achieve simultaneously by two different mechanisms, are facilitated by the use of the leaf spring.

A fifth object of the invention is to provide a modified pivot mounting for the motor shaft. The axial displacement by several millimetres of the motor shaft and flywheel, to follow variations in the compression ratio, is not a serious inconvenience since an adjustable control for a clutch carried by the flywheel can be provided, there being axial displacement of the gearbox shaft.

However, most automobile manufacturers would prefer to have the usual axially fixed flywheel without introducing a supplementary constraint. This is why it is preferable to provide a construction with a longitudinally fixed shaft. Naturally the shaft can be made in two relatively sliding parts, one part being carried by the crank and being axially displaceable, while the other carries the axially fixed flywheel, the adjustment being achieved by keyways. The inconveniences of sliding keyways insofar as significant alternating force couples is concerned are known. Also, the invention proposes the axial sliding of the crankpin in the eye of the crank by means of a nut, whereof the exterior surface is a cylinder with an axis parallel to the motor axis and which mounts inside a swivel. In these conditions, the crank, the shaft and the flywheel are longitudinally fixedly retained by an abutment. The swivel follows the axial displacement of the central shaft; the sliding cylindrical adjustment of the eye of the crank cannot sustain couples but only relatively small forces and functions with a very slight play.

BRIEF DESCRIPTION OF THE DRAWINGS

The invention will now be described by way of example with reference to the accompanying drawings, in which.

DETAILED DESCRIPTION OF THE PREFERRED EMBODIMENT

Figure 1:
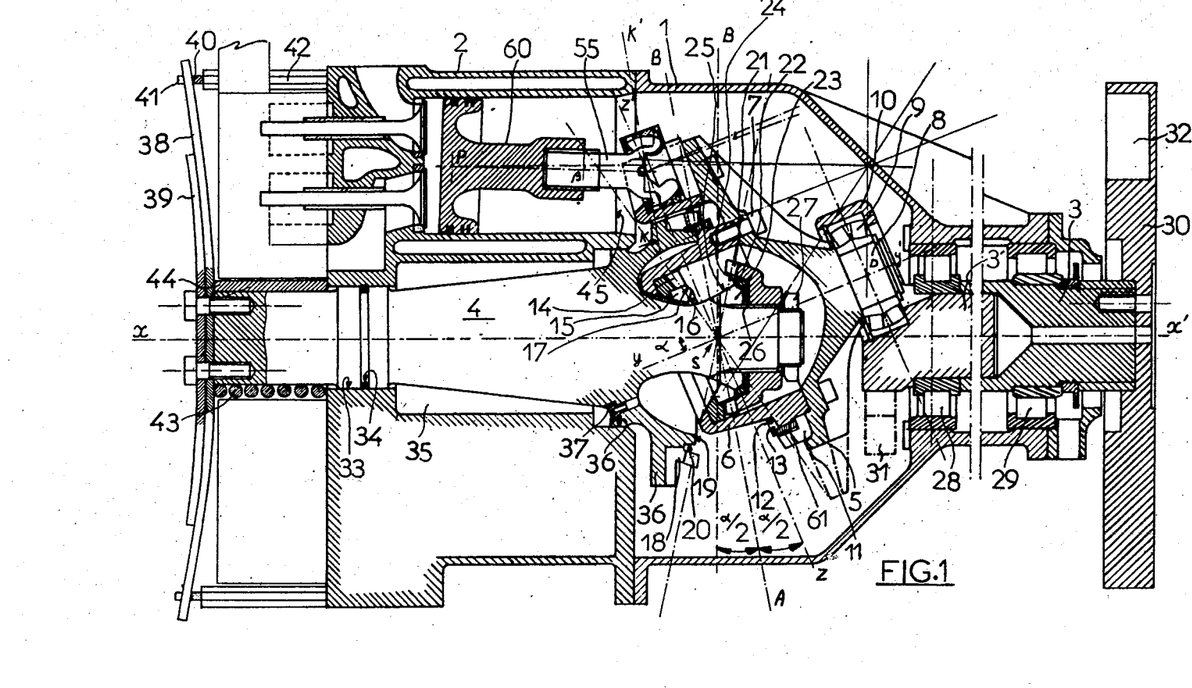
FIG. 1 is a longitudinal sectional view of a motor according to the invention showing an arrangement of radial bearings.

The casing of the motor shown in FIG. 1 comprises two principal castings bolted concentrically together; one part 1 of the casing enclosing the moving parts and carrying the motor shaft 3—3' and the other part 2 comprising the cylinder head carrying the cylinders, the cooling circuit, and the valves, and, in its central portion, the reaction shaft 4.

The mechanism comprises three main assemblies: the motor shaft 3—3', the reaction shaft 4, and the seat 5-6.

The motor shaft 3—3' comprises, for convenient construction, an exterior shaft 3 and an interior shaft 3' concentrically enclosed in one or other of the parts of the casing by keys (not shown). The shaft 3 carries a flywheel 30 and conventional sealing arrangements together with the valve operating mechanism (not shown).

The shaft 3 carries the crank 10 which receives a rotational movement by means of the rollers of a swivel 9 mounted on the tail 8 of the seat 5. The center of the rotational movement of the crank is at D and relative displacement along the axis y—y' between the seat 5 and the crank 10 is prevented by appropriate means such as circlips.

On the shaft 3 are mounted, in opposition to the crank 10, detachable counter-weights 31.

The shaft 3—3' of the motor is carried by roller bearings 28 and 29 which permit a certain axial displacement of this shaft. The cut-away portion 32 of the flywheel gives rise to an imbalance in order to create, in rotation, a turning couple opposed to the imbalance formed at D by the crank 10 and the tail of the seat.

Coaxial with and opposite to the shaft 3—3' is the reaction shaft 4 which is centered relative to cylinder head 2 by bearing surfaces 36 and 33. Toroidal sealing joints are mounted on the bearing surfaces. For example, the joint 34 is mounted on the surface 33. The volume 35 between the shaft 4 and the casing 2 is filled with oil under pressure from a pump (not shown). A nozzle 37, screwed to the shaft 4, ensures the lubrication of the mechanism and also, as will be explained later, the damping of axial movement of the shaft 4.

The axial damping action of the shaft slows down the motion of the pistons at the end of each compression stroke without inconvenience and without slowing down the return stroke (to prevent pinking).

Figure 4:
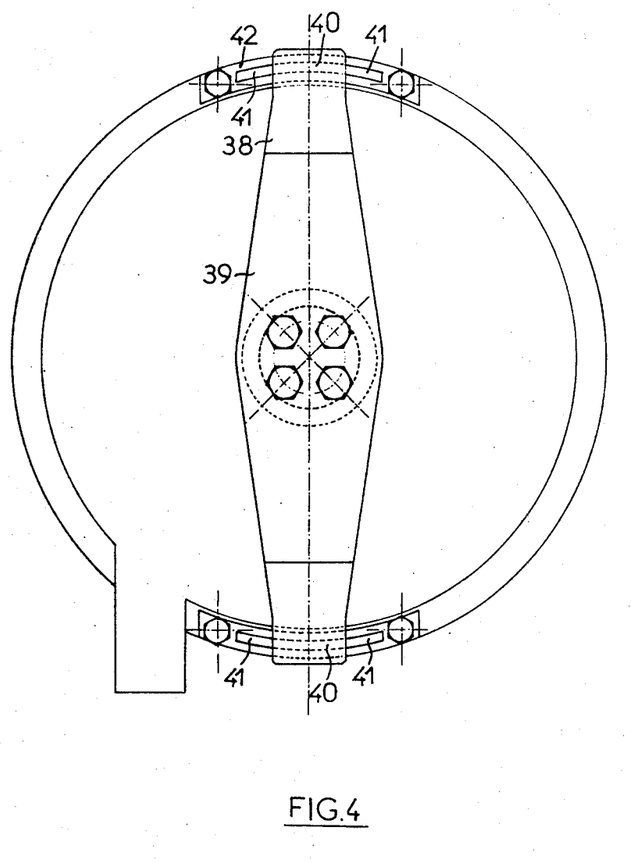
FIG. 4 is an end view of the motor showing a preferred arrangement of springs.

On the end of the shaft 4 is connected an arrangement of leaf springs, two springs 38 and 39 only being shown. The main spring 38 as shown in FIG. 1 and FIG. 4, is supported at 40 by supports 42 integral with the casing 2. Rotation of the springs and in turn the shaft 4, by the abutments 41. Beneath the spring 38 and around the end of the shaft 4 are located either supplementary coil springs 43 or cylindrical abutting braces 44, either of which are supported by the casing 2. Measurement of the shaft 4 in the other direction is prevented by the surfaces 45 of the casing 2.

According to the basic principle, the shaft 4, which is prevented from rotation by the exterior spring 38, carries the fixed elements of the cone with 2 nappes along the axis x—x'. On a flared annular portion 36' of the shaft are located the fixed outer cones with toothed and smooth surfaces. The fixed inner cones with toothed and smooth surfaces are located on a central projection of the shaft 4. The description of these fixed cones will be made hereafter at the same time as the corresponding cones of the seat.

The seat 5-6 comprises the seat proper 5 and a counter-seat 6. These two parts are assembled concentrically and attached to the assembly by bolts 7. The end or tail 8 carries, coaxial therewith, the bearing 9. The counter-seat 6 carries in its interior the moving inner smooth and toothed cones and exteriorly the moving outer smooth and toothed cones, which cones are located concentrically between the seat 6 and the seat 5.

In the embodiment shown in FIG. 1 the different cones are as follows:

The smooth outer fixed cone 19 is formed directly on the flared portion 36' of the shaft 4 and has a summit angle of 180°-α.

The smooth outer moving cone 12 is formed directly on the counter-seat 6 and has a summit angle of 180°-α. This cone 12 rolls without sliding on the preceding cone 19.

The toothed outer fixed cone 18 is located on the flared portion 36' of the shaft 4 and forms a primary cone with a summit angle of 180°-α. This cone engages with the toothed outer moving cone 11 carried by the counter-seat 6, thereby forming a primary cone of the same summit angle.

The smooth inner fixed cone 25 is formed on an annulus member 23 of hardened steel located and centered on the projection 26 of the shaft 4. The smooth inner fixed cone summit angle is approximately 60° and its generatrix is cut into two almost equal parts by the bisectrix AB.

The smooth inner moving cone 16 is formed on an annulus 15 of hardened steel located and centered on the counter-seat 6. The summit angle of the smooth inner moving cone is equal to that inner fixed cone 25 increased by 2α.

The toothed inner fixed cone 21 is located and centered on the projection 26 of the shaft and forms a primary cone with a summit angle of 180-α. The inner fixed cone 21 engages the toothed inner cone 14 forming an identical primary cone which is carried by the counter-seat 6.

In these two toothed pairs 11-18 and 14-21, the circumferential play of the teeth is minimal lower than or equal to 0.05 mm.

The rolling surfaces are illustrated in the example of FIG. 1 as follows:

A radial outer fixed cylindrical surface 20 (a cone with a summit angle of zero) is formed on the flared portion 36' and the shaft 4, thus limiting exteriorly the cone 19.

In communication with this surface 20 is an exterior moving surface 13 of summit angle 2α formed on a rim 61, mounted on the counter-seat 6 and located to the interior of the toothed cone 11.

The inner radial abutment is made by the fixed cone 25 in conjunction with the moving cone 16. The summit angles of these cones is maintained small in order to ensure radial abutment by the mating of a fixed planar face 24 (summit angle 180°) with the cone 17 of summit angle 180°-2α.

The moving face 24 is formed on a member 22 mounted concentrically on the projection 26 of the shaft between the annulus 23 and the toothed cone 21. These three members 23, 22 and 21 are locked onto the projection of the shaft 26 by a screw 27 and are further prevented from rotating by a splined connection with the shaft.

Figure 2:
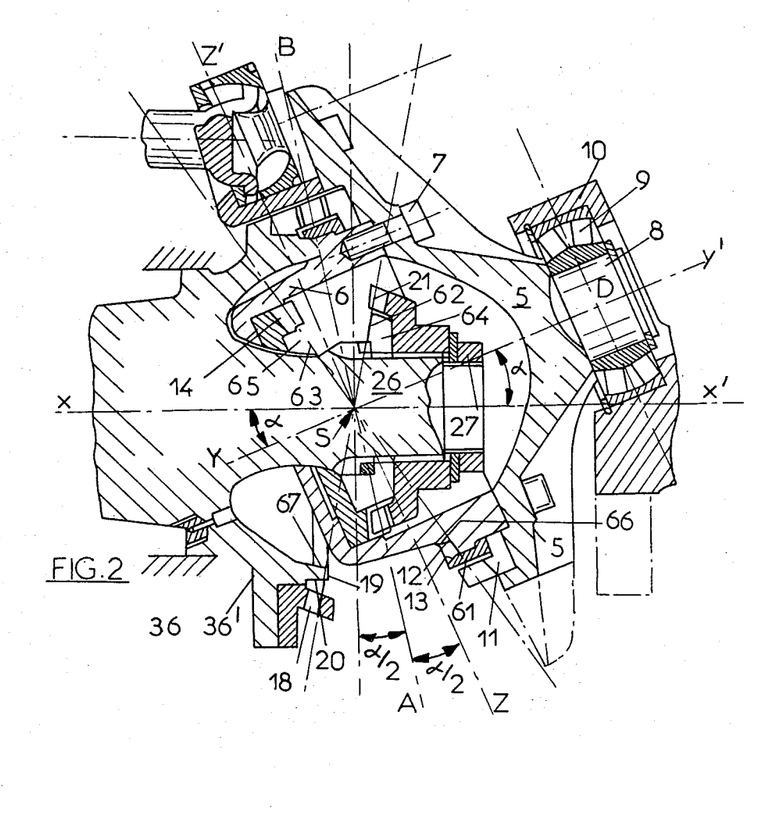
FIG. 2 is a partial view of FIG. 1 showing a different arrangement of conical surfaces for support and centering.

The cone 17 is formed on the annulus 15, which is cylindrically encased with the teeth 14. These two members are attached to the counter-seat 6 by means not shown. In the example shown in FIG. 2, the different cones are as follows:

The two toothed pairs are identical with those shown in FIG. 1, 11-18 and 14-21 and are mounted with the same tolerance set forth above.

The outer supported cones 12 and 19 are also identical with hose of FIG. 1 each having a summit angle of 180°α following the primary cones generated by the bisector of FIG. 2.

Outer abutting surfaces 13-20 are also similar with those in FIG. 1.

On the contrary the smooth inner cones are entirely different. The fixed cone 62 of summit angle 180°-α mates with the moving cone 63 of the same summit angle and can thus roll, without sliding, following the primary cones generated by the bisectrix AB.

The fixed cone 62 is formed on the annulus 64 attached to the projection 26 of the shaft. The moving cone 63 is formed on the annulus 65, located between the toothed cone 14 and the central axis of the counter-seat 6.

The two radial rolling abutting surfaces necessitated by the shape of the supported cones 62 and 63 are provided by a cylindrical surface 66 formed on the counter-seat, which is in rolling contact with a mating conical surface 67 having an angle 180°-2α. The conical surface is formed by the flared portion 36' of the shaft 4. The cylindrical surface 66 is formed slightly barrel-shaped.

Figure 5:
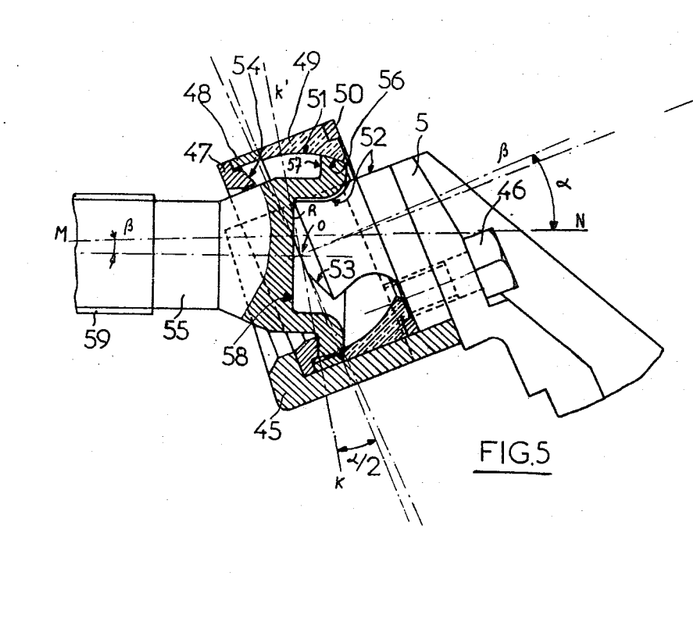
FIG. 5 is an enlarged partial view of FIG. 1, showing a detail of the attachment of a connecting rod to the seat.
Figure 6:
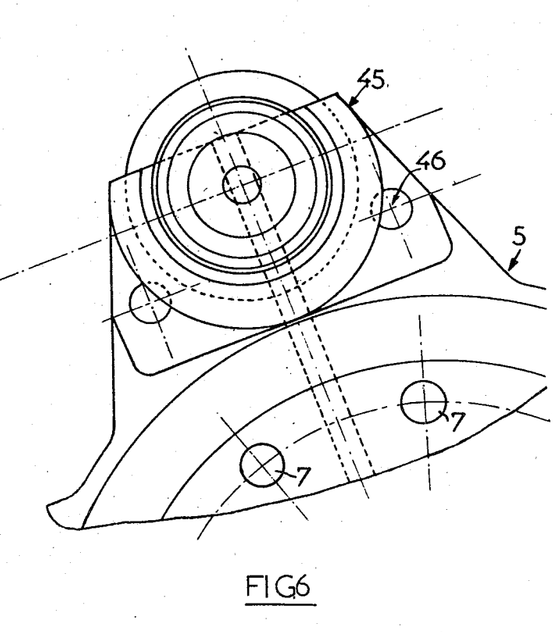
FIG. 6 is a view of the attachment of the connecting rod to the seat along the axis of the seat.

The seat 5 is provided with cylindrical lugs. One of these lugs is visible in FIGS. 1,2,5 and 6. Each lug carries a connecting rod attachment corresponding to one cylinder. Referring to FIGS. 5 and 6, the center of attachment of the connecting rod is at a point 0. This point 0 is located in a plane z—z' perpendicular to the axis y—y' at the point S of its intersection with x—x'(see FIG. 2). As is known, and which has been already described in French Pat. No. 2,232,951, all the points of this plane and particularly point O are described when y—y' turns around x—x', a trajectory which is the intersection of a sphere of centre S and radius OS with a cylinder inwardly tangential to the sphere on an axis parallel with x—x' and of the diameter OS (1-cosα).

The projection of this trajectory on the crosssection of FIG. 1 is a circular arc of center S and radius OS. Its projection on a plane perpendicular to the preceding plane is a curve following a lemniscate path (a FIG. 8 shaped curve) and its projection on a plane perpendicular to x—x' is a small circle of diameter OS (1-cosα), at right angles to the tangential cylinder.

It has been found noteworthy to make the axis MN of the cylinder under consideration (FIG. 5) intersect the axis of the tangential cylinder. As a result, the point O is always a constant distance from the axis MN and the connecting rod PO always makes a constant angle β with the axis MN. At two points of the piston stroke above and beneath the centre, the point O is above the axis MN as also is the angle β. It follows that the axis of the connecting rods P.O are parallel to two center points moved an angle β from the axis MN. If one considers two limiting center points, all the connections of the connecting rod on the seat are shifted by an angle β in relation to the axis MN and AB. In this case in particular the bisectrix of the angle α, KK' is shifted by an angle α in relation to the bisectrix AB. Similarly, at the point O, the axis of the support 52 fixed to the lug of the seat 5 is shifted by an angle β in relation to y—y'.

It is found that all intermediate positions of the point O between tthe two center points do not suffer this general movement and in all parts of the trajectory of O, the angle of PO with the axis of the support 52 remains almost constant, with a small error which is almost negligible, and which can be stated as follows with:

$$\beta \pm \frac{OS}{PO} \frac{(1-\cos\alpha)}{2}$$

This being understood, the remainder of the motor can be described as follows:

With reference to FIGS. 5-8, the extension of the connecting rod 55 has an axis PO (FIGS. 1 and 5). It is adjustable within the piston 60 by screwing or other axially movable means. It has a support surface 58 which is planar and perpendicular with its axis OP at a distance O such that the bisectrix KK' meets it at a point R a little nearer to the circumference than the center. On a flared portion of the extension, is provided another plane surface 57 also perpendicular to the axis PO and situated at a distance from O in the direction towards P, such that the bisectrix KK' meets it at point T which is almost at the middle of the annulus. The exterior surface 56 of the flared portion is a spherical segment of centre O. The extension is encased in a fixed casing on the lug of the seat 5 (FIGS. 5 and 6). This casing comprises essentially the members in contact with the surfaces of the stamp, that is, the support member 52 of hard steel terminated by a cone 53 of summit angle 180°-2α. This cone is very slightly bevelled about a point R, the center of contact with the plane 58 of the extension:

the annular member of a counter-support 47 with a conical surface 54 of summit angle 180°-2α. This surface is slightly bevelled about a point T, the center of contact with the annular surface 57 of the extension.

a bearing member 49 of special light-weight metal of low coefficient of friction. The bearing has an interior hemispherical surface 51 which is in sliding contact with the spherical segment 56 of the extension.

These three members are adjusted concentrically in a casing 45. A screw 46 locks this casing 45 against the lug which consequentially connects the three above-mentioned members against the lug. Between these three members are interposed two wedges 48 and 50, the former regulating the play of the spherical contact of the lateral guiding and the latter regulating the axial play of the rolling contacts. The casing 45 has a maximum thickness at the lower generatrix nearest to x—x', since, in this region, the inertial forces of the piston are greatest. This thickness progressively decreases and the portion opposite to x—x' is completely truncated since there are practically no forces in the casing in this region. This configuration is important to reduce the inertia of the seat.

Figure 7:
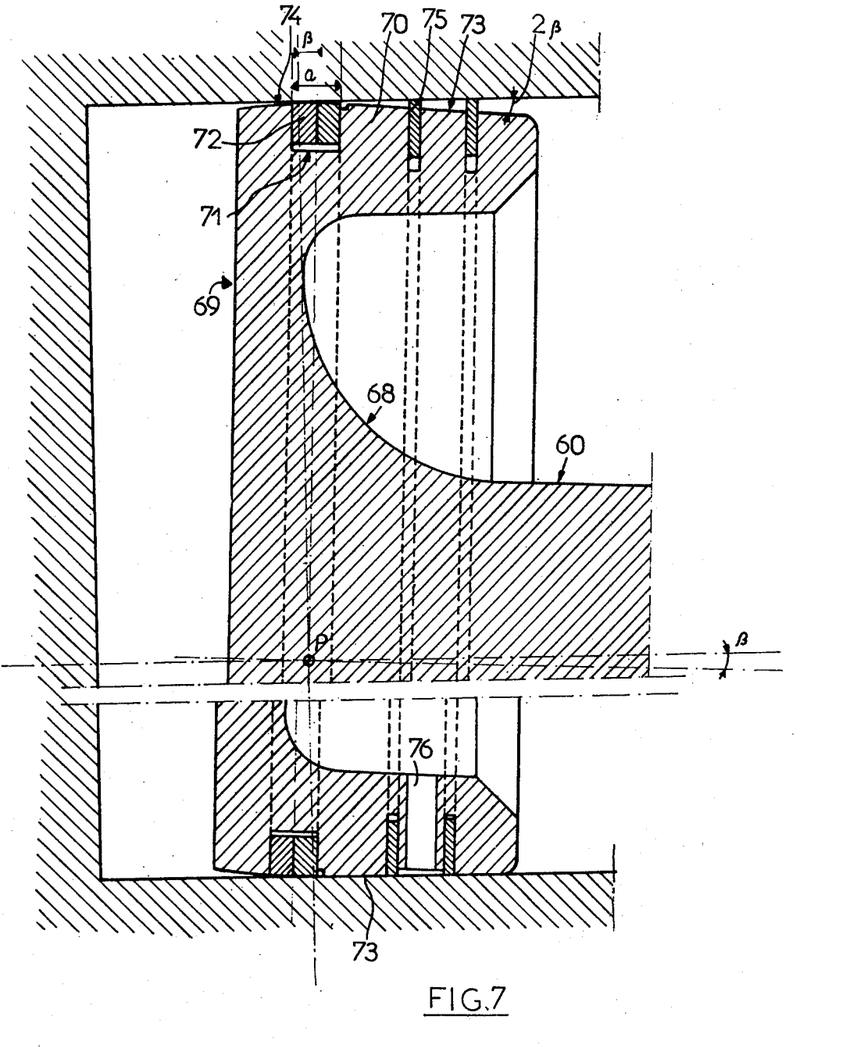
FIG. 7 is an enlarged partial view of FIG. 1 showing a detail of a piston and its construction.

The enlarged view of the piston 60 in FIG. 7 shows its simplicity. The piston is formed by a flared portion of the connecting rod from a throat to a large radius 68 formed integrally with the end 69 of the piston. This formation allows a maximum flow of heat to be diverted towards the center of the connecting rod which is well surrounded by oil to relieve the piston rings of excess heat.

The skirt 70 of the piston is provided with a groove 71 for mounting the piston scraper rings. The center of the rings define a point P which is the center of nutation of the connecting rod. The single or double scraper rings 72 have a spherical contact surface with the bore of the cylinder. In order to retain perpetual contact with the cylinder in the course of its nutation, the width a is of necessity greater than the ample $\beta \phi$. On either side of the scraper ring 72 the surface of the skirt is conical in a fashion whereby a generatrix of the inner cone 73 supported on the cylinder is inscribed in the cylinder in all the positions of its travel. This is made possible by the low lateral thrust of the piston. The outer cone 74, on the firing side, never touches the bore. The oil scraper ring is constructed by two thin segments 75, between which are located orifices 76 leading annularly around the skirt 70.

The first alternate embodiment (FIG. 8) is an improved construction in which the piston has a floating skirt as described in French Pat. No. 2,232,951. Here, the piston 95 is integral with the connecting rod 55 and is provided at its rear with a spherical surface 96 which cooperates with a counter piston 97. The counter piston is integral with a cup 98 which is provided with a spherical central surface 99 mounted on a bearing 100 of the piston rod 101.

Figure 8:
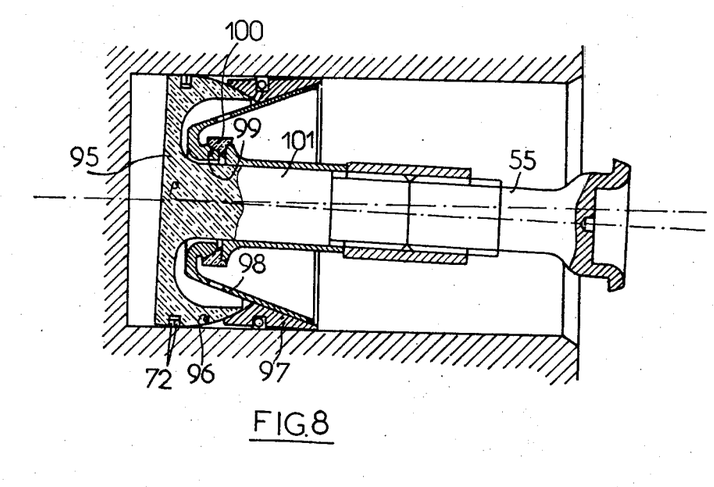
FIG. 8 is a longitudinal sectional view of a modified piston provided with a floating skirt.

As indicated above, the piston 95 is conical to one side of a groove in which are located two scraper rings 72. The center P of this groove is the center of movement of the nutation of the piston 95 and its connecting rod 55.

Figure 9:
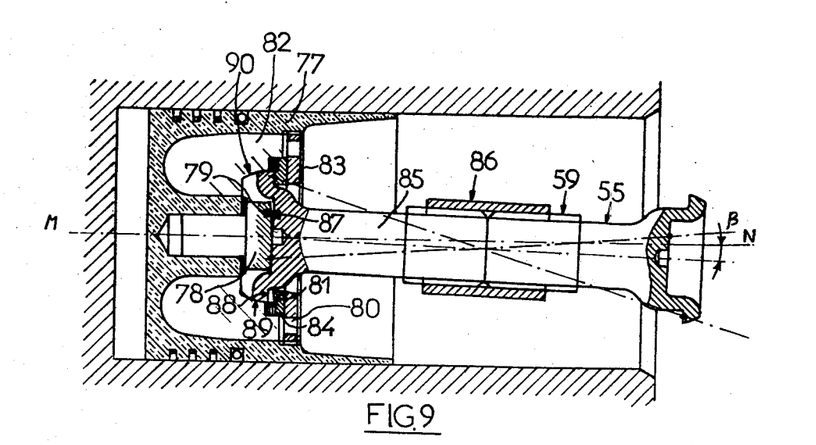
FIG. 9 is a longitudinal sectional view of another modified piston showing its connection with the connecting rod.

In the modification of the piston shown in FIG. 9, the piston 77 resembles exteriorly a conventional piston as do the scraper rings. It carries at its center a plug 78 with the support cone 79 of summit angle 180°-2β; an annulus 80 with the support cone 81 of the same summit angle; the arrangement of radial ribs 82; and a detachable transverse plate 83 for immobilising the cone 81. This plate 83 is cut-away in order to provide apertures 84 for the passage of oil. The extension of the connecting rod 55, above described, is assembled with the extension 55 adjacent the piston, by means of a sleeve 86. The extension 85, similar to the extenstion 55, carries two planar surfaces perpendicular to its axis. One surface is an interior surface 87 which bears against the cone 79. The other surface is an exterior surface 88 which bears against the cone 81. Moreover, the flared portion is limited by a spherical segment 89 adjusted with play in the hemispherical surfaces 90 of the radial ribs 82. Two sets of wedges permit adjustment respectively in the axial play and the peripheral play.

The piston rod, constituted by the two extensions, has an axis which always makes an angle $\beta$ with the axis MN of the cylinder and the piston, and turns around the axis MN with a speed 2w (w being the speed of the motor).

Figure 3:
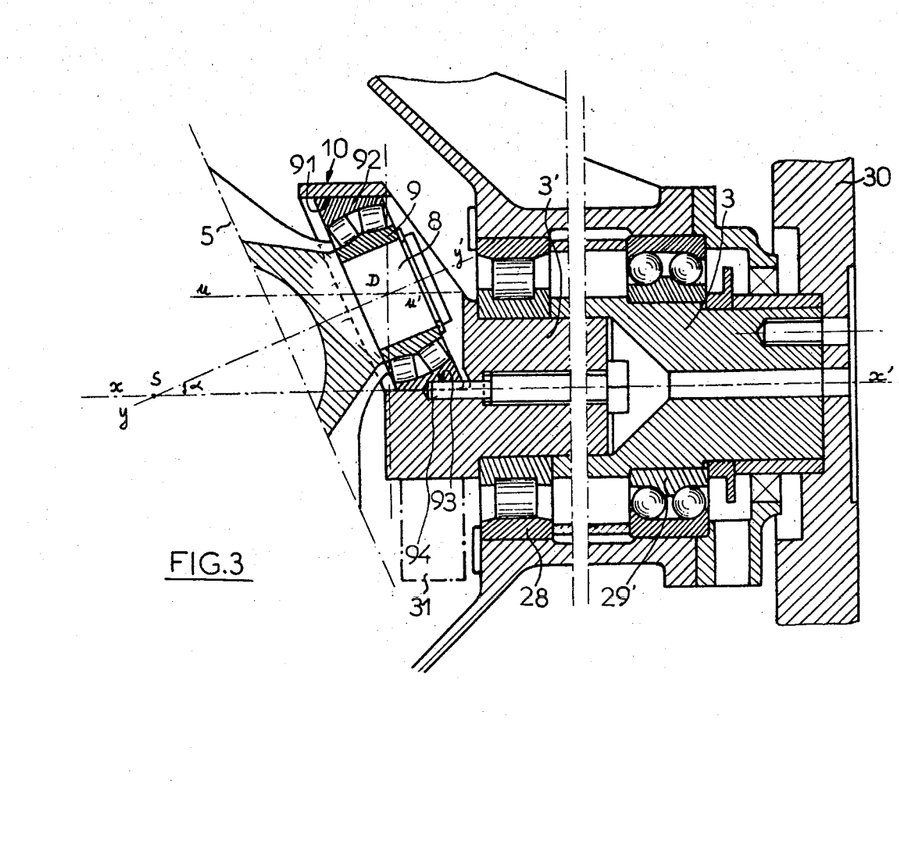
FIG. 3 is a partial view of FIG. 1 showing a fixed shaft of the motor and a crank-pin sliding in the eye of a crank.

The arrangement of the motor with a fixed longitudinal axis is shown in FIG. 3. The motor shaft comprises, in a first arrangement, the shafts 3 and 3' housed one within the other and fastened together by pins. The roller bearing 28 adjacent the cranks is maintained identical to bear a high load. On the contrary, the bearing 29 in the first modification is replaced by a bearing with two oblique ball races which can bear a higher thrust imposed through the seat 5 or through the exterior elements by the fly-wheel 30.

The crank 10 is traversed by a bore 91 along its axis u—u' parallel to x—x'. The point D, the centre of the swivel, is at the intersection of the axes u—u' and y—y'. The distance from the point D to the axis x—x' is the same as that in the arrangement shown in FIG. 1. The length SD and the angle are likewise the same as in FIG. 1 a. The seat 5 on the axis y—y' carries in the same fashion a swivel bearing 9. The exterior annulus of the seat, however, includes a cylindrical machined surface with an axis u—u' slidingly adjustable in the bore 91. This bearing, as is the seat, is shown in FIG. 3 in its highest driven position. On the thrust of the shaft 4, the bearing can vary the position of the shaft 3—3' by a few millimetres, the straight line SD being displaced parallel to itself.

It is not necessary that, during operation, the annulus 92 turn in its bore 91 which moves the axis xy' out of the plane y—y'/x—x'. It has no natural tendency, the angle α being sufficiently large, to oppose with jamming this relative rotation. However, for insuring rigidity, a cylindrical stud 94 fixed in the shaft 3' near its axis is slidably adjustable in the corresponding groove 93 of the annulus 92 and positively prevents any tendency for unwanted rotation.

The operation of this barrel motor is as follows and is described particularly with regard to the link mechanism.

The pistons reciprocate by operation of the connecting rods. They are the source of the inertial forces during the rapid operation of the motor.

The resultant force F of the compression strokes of the pistons is directed along the axis PO. The connecting rod supports an equal reaction R at a movment arm F X OR. This torque is balanced by an opposite torque giving two reactions. A lateral reaction on the piston 60 and 73 and a lateral reaction on the guiding hemispherical surface 56. These reactions have a value:

$$F \times \frac{OR}{PO}$$

which is approximately 0.06 F.

It can be seen that the lateral forces on the piston and the bearings are relatively small.

The reaction due to the inertial forces F' have for their value $$F \times \frac{OT}{PO}$$

which is approximately 0.16F'. F' is small because the mass of the piston connecting rod is small.

These reactions (which result from the compression forces and the inertial forces) oppose one another. Their resultant is thus smaller than either of them.

However, this supplementary reaction should not be forgotten, which is that caused by the connection of the connecting rod (FIG. 5). The connecting rod turning through an angle β around the axis MN at an annular speed 2w (if w is the speed of the motor shaft) is subjected to a centrifugal force 4.M.W². OP. This force combines with the two aforesaid reactions (compression and inertia) and acts in the bearing 49. The calculations made in all operational states of the motor show that the resultant force of all the radial forces on the bearing 40 remains very small.

What is claimed is:

1. A motor comprising:
   a first drive shaft having a central axis and a crank offset from said central axis;
   a second shaft having a common axis aligned and parallel to said central axis of the first drive shaft;
   at least one piston having a central axis parallel to the central axis of the second shaft and further being offset therefrom at a predetermined distance;
   a seat having one end portion and an opposite end portion, said one end portion attached to said at least one piston for movement therewith, said seat further having a first truncated conical surface portion with two nappes integral therewith and a central axis forming an obtuse angle with said common axis of the second shaft, said opposite end portion of the seat having a second truncated conical surface portion with two nappes angularly fixed relative to said second shaft, said first and second conical truncated cone surface portions having a common generatrix along a plane bisecting said obtuse angle subtended by the axis of the shaft of the motor and the axis of said seat, said seat further being attached axially at one side to said crank of said first drive shaft of the motor and at its other side supported by a pivot defined on said common generatrix by the said first and second truncated cone surface portions, said first and second conical surface portions further comprising a mutually engageable pair of meshing toothed cones, one of said mutually engageable pair of toothed cones, being mounted to said first conical surface portion, the other of said mutually engageable pair of toothed cones being mounted to said second conical surface portion and a mutually engageable first pair of smooth surface cones, one of said first pair being mounted to said first conical surface portion, the other of said first pair being mounted to the other of said first piar of smooth surface cones, each of said mutually engageable first pair of smooth surface cones contacting one another and being coaxial and contiguous with said meshing toothed cones, each of said mutually engageable first pair of cones having a summit angle between zero degrees and one hundred eighty degrees;
   a second pair of mutually engageable smooth cones, said first and second pair of cones rolling against each other free from slippage, said first pair of cones further providing axial support and said second pair of cones further providing radial support so that said first and second pairs of mutually engageable smooth cones minimize the displacement of one cone relative to the other along said generatrices of said mutually engageable smooth cones and thereby reduce internal friction wear, the generation of heat by one cone moving relative to the other and the loss of energy;
   means for adjusting said pivot of said seat on said central axis of said motor, said adjusting means being effective during the operation of said motor and mounted to said first drive shaft;
   means for rotatably driving said first shaft; and
   means for attaching said at least one piston to said seat, said rotatable driving means driving said first shaft and said seat, said rotary movement of said seat generating axial reciprocating motion of the at least one piston.

2. A motor according to claim 1 wherein said pair of cones providing axial support has the same summit angle of the corresponding pair of meshing toothed cones, and wherein further the said other pair of cones providing radial guiding each have one cone with a summit angle of zero mating with one cone having a summit angle equal to 2α, α being the obtuse angle defined between the seat axis and the motor axis.

3. A motor as claimed in claim 1 or 2, in which all the fixed and kinetic claimed elements of the motor are supported on said first and second shaft axially traversing the motor, said motor further comprising a leaf spring fixed to said second shaft to automatically vary the compression ratio and to receive a reactive couple for transmission to a casing of the motor.

4. A motor as claimed in claim 1 or 2, in which the first shaft is longitudinally fixed by a rolling abutment, comprising a swivel in a cylindrical bore of a crank mounted to said first shaft, said swivel permitting axial displacement.

5. A motor according to claim 1, wherein said means for attaching said at least one piston to said seat, further comprises: a connecting rod attached to the seat; two pairs of planar support cones integral with said connecting rod, one pair in each direction of rotation; and a radial guiding means having a spherical bearing.

6. A motor according to claim 1 in which each pair of support cones integral with said connecting rod comprises a cone with a summit angle of 180° mating with a cone having a summt angle of 180°-2α, the two planar support surfaces being on the connecting rod and the two conical support surfaces being on the seat.

* * * * *

UNITED STATES PATENT AND TRADEMARK OFFICE
CERTIFICATE OF CORRECTION

PATENT NO. : 4,304,173
DATED : December 8, 1981
INVENTOR(S) : Maurice Brille

It is certified that error appears in the above—identified patent and that said Letters Patent is hereby corrected as shown below:

Column 2, line 52, after "several" delete "millimetres" and insert therefor ---millimeters---;

Column 4, line 21, after "main spring 38" please add ---,---;

Column 4, line 23, after "the shaft 4" please delete "," and insert therefor ---is prevented---;

Column 4, line 27, after "casing 2." please delete "Measurement" and insert therefor ---Movement---;

Column 4, line 64, after "hardened steel" please insert ---,---;

Column 5, line 4, after "is equal to that" please insert ---of the---;

UNITED STATES PATENT AND TRADEMARK OFFICE
CERTIFICATE OF CORRECTION

PATENT NO. : 4,304,173
DATED : December 8, 1981
INVENTOR(S) : Maurice Brille

It is certified that error appears in the above—identified patent and that said Letters Patent is hereby corrected as shown below:

Column 5, line 8, after "angle of" delete "180-a." and insert therefor ---180°-a---;

Column 5, line 47, after "cal with" delete "hose" and insert therefor ---those---;

Column 5, line 49, after "bisector" please insert ---AB---;

Column 5, line 64, after "surface 66" please insert ---,---;

Column 6, line 12, after "sphere of" delete "centre" and insert therefor ---center---;

Column 6, line 15, after "trajectory on the" delete "crosssection" and insert therefor ---cross-section---;

UNITED STATES PATENT AND TRADEMARK OFFICE
CERTIFICATE OF CORRECTION

PATENT NO. : 4,304,173
DATED : December 8, 1981
INVENTOR(S) : Maurice Brille

It is certified that error appears in the above—identified patent and that said Letters Patent is hereby corrected as shown below:

Column 6, line 28 after "beneath the" delete "centre," and insert therefor ---center,---;

Column 6, line 45, after "with" and before ":" insert ---precision---;

Column 6, line 56, after "perpendicular with its axis" delete "OP" and insert therefor ---PO---;

Column 6, line 65, after "segment of" delete "centre" and insert therefor ---center---;

Column 7, line 4, after "extension" delete ":" and insert therefor ---.---;

Column 7, line 43, after "greater than the" delete "ample" and insert therefor ---angle---;

UNITED STATES PATENT AND TRADEMARK OFFICE
CERTIFICATE OF CORRECTION

PATENT NO. : 4,304,173
DATED : December 8, 1981
INVENTOR(S) : Maurice Brille

It is certified that error appears in the above—identified patent and that said Letters Patent is hereby corrected as shown below:

Column 7, line 53, after "embodiment" please insert ---of the piston---;

Column 8, line 5, after "plate 83 for" delete "immobilising" and insert therefor ---immobilizing---;

Column 8, line 9, after "tension 55" please insert ---,---;

Column 8, line 10, after "similar to the" delete "extenstion" and insert therefor ---extension---;

Column 8, line 35, after "point D, the" delete "centre" and insert therefor ---center---;

Column 8, line 39, after "and the angle" insert the alpha sign ---a--- in italics;

Column 8, line 40, after "FIG. 1" delete the alpha sign "a" which appears in italics;

UNITED STATES PATENT AND TRADEMARK OFFICE
CERTIFICATE OF CORRECTION

PATENT NO. : 4,304,173
DATED : December 8, 1981
INVENTOR(S) : Maurice Brille

It is certified that error appears in the above—identified patent and that said Letters Patent is hereby corrected as shown below:

Column 8, line 45, after "driven position," delete ---On--- and insert therefor ---Depending on---;

Column 8, line 47, delete "millimetres," at the beginning and insert therefor ---millimeters,---;

Column 8, line 66, after "reaction R at a" delete "movement" and insert therefor ---moment---.

Signed and Sealed this

Eighth Day of June 1982

[SEAL]

Attest:

GERALD J. MOSSINGHOFF

*Attesting Officer*  *Commissioner of Patents and Trademarks*